United States Patent
Fergus

(10) Patent No.: US 6,725,444 B2
(45) Date of Patent: Apr. 20, 2004

(54) SYSTEM AND METHOD FOR PROGRAMMABLE REMOVAL OF SENSITIVE INFORMATION FROM COMPUTING SYSTEMS

(75) Inventor: Joseph E. Fergus, Herndon, VA (US)

(73) Assignee: Communication Technologies, Inc., Chantilly, VA (US)

( * ) Notice: Subject to any disclaimer, the term of this patent is extended or adjusted under 35 U.S.C. 154(b) by 350 days.

(21) Appl. No.: 09/735,896

(22) Filed: Dec. 14, 2000

(65) Prior Publication Data

US 2002/0077999 A1 Jun. 20, 2002

(51) Int. Cl.[7] ................................................ G06F 9/44
(52) U.S. Cl. ........................................................ 717/100
(58) Field of Search ................................. 717/100–103, 717/168–173; 707/200–206; 711/100; 713/181–186, 200–202

(56) References Cited

U.S. PATENT DOCUMENTS

| | | | | | |
|---|---|---|---|---|---|
| 4,663,736 | A | * | 5/1987 | Furusawa et al. | 707/200 |
| 5,151,989 | A | * | 9/1992 | Johnson et al. | 707/10 |
| 5,666,532 | A | * | 9/1997 | Saks et al. | 707/205 |
| 5,832,511 | A | * | 11/1998 | Beck et al. | 707/201 |
| 5,930,514 | A | * | 7/1999 | Thompson et al. | 717/170 |
| 6,115,799 | A | * | 9/2000 | Ogawa | 711/171 |
| 6,147,687 | A | * | 11/2000 | Wanderski | 345/853 |
| 6,487,563 | B1 | * | 11/2002 | Houldsworth | 707/206 |
| 6,550,061 | B1 | * | 4/2003 | Bearden et al. | 717/174 |

OTHER PUBLICATIONS

Seleznyov et al. Learning Temporal Patterns for Anomaly Instrusion Detection. ACM. 2002. pp. 209–213.*
Ning et al. Learning Attack Strategies from Intrusion Alerts. ACM. 2003. pp. 200–209.*
Fisch et al. The Design of an Audit Trail Analysis Tool. IEEE. 1994. pp. 126–132.*
"BCWipe Software For Windows 95/98/NT/2000", http://www.jetico.sci.fi/bcwipe.htm, pp. 1–2, Oct. 19, 2000.
"PURGE Positive Disk Erasure Utility", http://www.sophos.com/products/datasecurity/purge.html, pp. 1–2, Oct. 19, 2000.
"DataEraser", http://www.ontrack.com/dataeraser/, pp. 1–4, Oct. 19, 2000.
"Erase Sensitive Data Reliably On Your Own!", http://www.ibas.net/products/ee.htm, pp. 1 of 1 and 1 of 2, Oct. 19, 2000.

* cited by examiner

Primary Examiner—Wei Zhen
(74) Attorney, Agent, or Firm—Antonelli, Terry, Stout & Kraus, LLP

(57) ABSTRACT

System and method for programmable removal of information from a computing system. One or more information removal options may be selected on a computing device. A purge script file based on the selected one or more information removal options is generated. A purge of information from a computing system is initiated by execution of the purge script file. The purge of information may also be automatically initiated by selection of one or more hotkeys. The purge of information may also be automatically initiated by detecting a preselected number of unsuccessful logon attempts to the at least one computing system and then automatically initiating the purge of information. A plurality purge script files may be generated where each generated purge script file is based on different preselected information removal options. The initiating of the purge of information may be performed by execution of a selected one of the plurality of purge script files. The purge script files define the information to be purged.

26 Claims, 10 Drawing Sheets

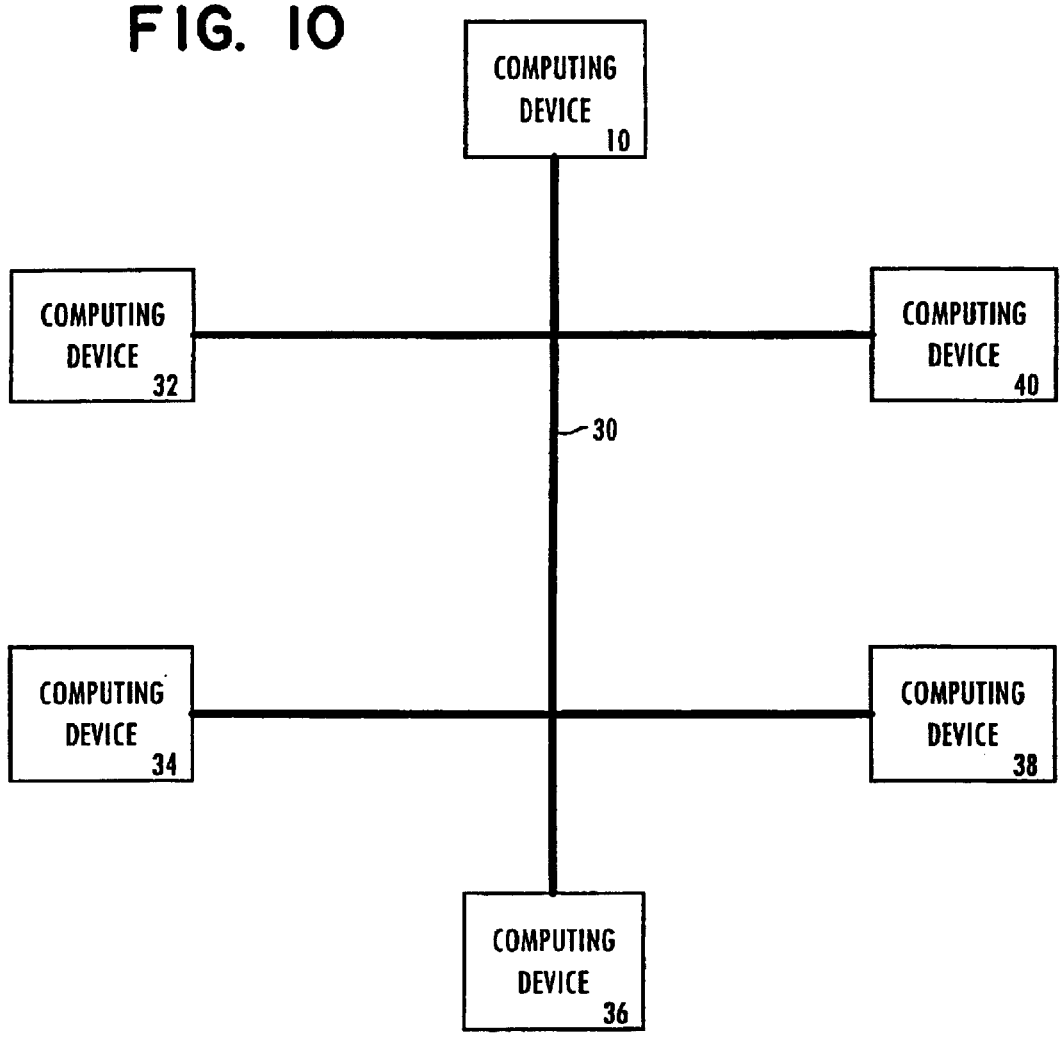

SYSTEM AND METHOD FOR PROGRAMMABLE REMOVAL OF SENSITIVE INFORMATION FROM COMPUTING SYSTEMS

BACKGROUND

1. Field of the Invention

This invention relates to deletion of information in computer systems, and more specifically to the programmable removal of sensitive information from computing systems.

2. Background Information

Computing systems security is becoming increasingly more important. It is not uncommon for computing systems such as computers, servers, workstations, etc. to contain sensitive information related to a corporation or entity's business, personnel, finances, or technology. In government or military computing systems, the sensitive information may related to other data, for example, strategic plans, troop movements, intelligence data, etc. A problem arises when a hostile entity gains access to the computing system and, therefore, possibly access to sensitive information. Further, computing systems may become obsolete and, therefore, it may be desired to give away, or use for other purposes the computing systems. In these situations, it may be necessary to remove all sensitive information that may reside on each computing system.

Currently, systems and methods that provide sensitive information removal generally fall into one of two categories. In the first category, the existing operating system on the computing system coexists with the facility used to remove sensitive information. In the second category, the facility that performs the removal of sensitive information contains its own operating system. The second category is problematic in that no selectivity in the type of information to be deleted is provided. These type facilities are designed for a singular purpose only and are limited in that they are not configurable.

Moreover, current systems offer limited flexibility in selection of deleting or removing sensitive information from computing systems. In the case of a hostile entity, it is desired that an operator of a computing system, once detecting that a hostile entity may have gained access, may desire to immediately initiate removable of all sensitive information from the computing system. Further, it may also be desired to provide automatic initiation of removal of sensitive information without operator intervention. Current systems fail to provide these programmable options.

Therefore, there is a need for systems and methods for removal of sensitive information from computing systems that allows programmability, immediate initiation of removal, automatic initiation of removal of information, as well as bypass protection against hostile entities attempting to circumvent the sensitive information removal process.

SUMMARY

The present invention is directed to a method for programmable removal of information from a computing system that includes: selecting one or more information removal options, where the selecting is performed on a computing device; generating a purge script file based on the selected information removal options; and initiating a purge of information from one or more computing systems, where the purge is performed by execution of the purge script file.

The purge of information may be initiated upon selection of one or more hotkeys.

The purge of information may be initiated automatically when a preselected number of unsuccessful logon attempts to the computing system occurs. The method according to claim 1, further comprising generating a plurality of purge script files may be generated where each generated purge script file is based on different preselected information removal options. One of the plurality of purge script files may be selected where the initiating of the purge of information is performed by execution of the selected one of the plurality of purge script files.

Moreover, the present invention is directed to an article comprising a storage medium having instructions stored therein, where the instructions when executed cause a computing device to perform: receiving selections for one or more information removal options; generating a purge script file based on the selected information removal options; and initiating a purge of information from at least one computing system, where the purge is performed by execution of the purge script file.

The instructions when executed may cause a computing device to perform initiating the purge of information upon detecting the selection of one or more hotkeys. The instructions when executed may cause a computing device to perform detecting a preselected number of unsuccessful logon attempts to the computing system, and automatically initiating the purge of information after the detecting. The instructions when executed may cause a computing device to perform generating a plurality purge script files, where each generated purge script file is based on different preselected information removal options. The instructions when executed may cause a computing device to perform receiving a selection of one of the plurality of purge script files, where the initiating of the purge of information is performed by execution of the selected one of the plurality of purge script files.

The present invention is also directed to a system for programmable removal of information that includes: one or more processing devices; one or more storage devices operably connected to at least one processing device; and one or more data entry devices operably connected to at least one processing device. One or more information removal options may be selected using the data entry device(s). At least one processing device generates a purge script file based on the selected information removal options and initiates a purge of information from at least one storage device by executing the purge script file. One processing device may perform the generating and executing to purge information on at least one storage device operably connected to a second processing device.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 10 is a block diagram of an example system with multiple computing devices for programmable removable of sensitive information according to an example embodiment of the present invention.

DETAILED DESCRIPTION

Figure 1:
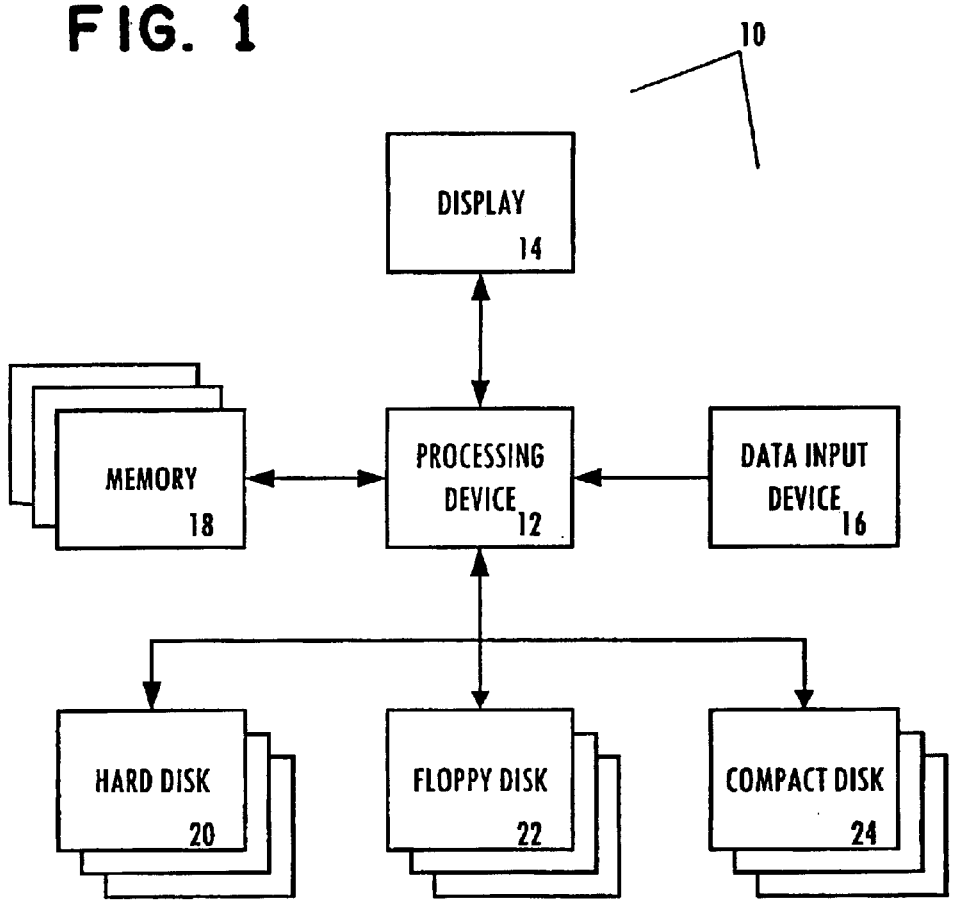
FIG. 1 is a block diagram of an example computing system for removal of sensitive information according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to systems and methods for programmable removal of sensitive information from computing systems that allows programmability of options regarding the removal of sensitive information. The present invention deletes files, directories, or the complete contents of an entire disk (hard or virtual). Systems and methods according to the present invention are flexible and programmable allowing a user to pre-select how, where, and when information is to be deleted from a computing system. A graphical user interface (GUI) on a display of the computing system may be used by a user to make the pre-selections.

Unlike the "Delete" feature in an operating system, e.g., Windows, the present invention deletes the file/directory information in the File Allocation Table (FAT) as well as overwriting the entire file in physical memory one or more times. Therefore, information retrieval after deletion (or purge) is impossible since the information no longer resides in the computing system.

In systems and methods according to the present invention, a user may generate multiple purge files, and select amongst the multiple purge files to determine which one will be used when a purge of sensitive information is initiated. Further, the user may designate one or more hot keys whereby once depressed, the removal of sensitive information is automatically initiated. Moreover, in systems and methods according to the present invention, the system may be set up to detect a programmable number of unsuccessful logon attempts to a computing system which will thereby initiate automatically the purge of sensitive information from the computing system.

FIG. 1 shows a block diagram of an example computing system for removal of sensitive information according to an example embodiment of the present invention. The computing system 10 includes a processing device 12 (which may be any type of processor or microprocessor), a display 14, one or more a data input devices 16 (e.g., a keyboard, mouse, etc.), one or more storage devices 18–24 that may store sensitive information. The storage devices may be one or more memories 20, hard disks 20, floppy disks 22, or compact discs 24. Data input device 16 may be used to enter options related to the removal of sensitive information. Display 14 may provide a user of computing system 10 with a graphical user interface (GUI) that allows easy selection 11 and entering of options related to removal of sensitive information or other information. Although computing system 10 is shown with multiple memories, hard disks, floppy disks, or compact discs, any computing system that includes one or more of any of these devices are within the spirit and scope of the present invention. Further, storage devices 18–24 may not exist in a computing device and still be within the spirit and scope of the present invention if the computing system contains information otherwise stored in the computing system that is to be removed. Computing system 10 may include information that resides in any one of memory 18, hard disk 20, floppy disk 22, or compact disk 24, or any other storage device.

Figure 2:
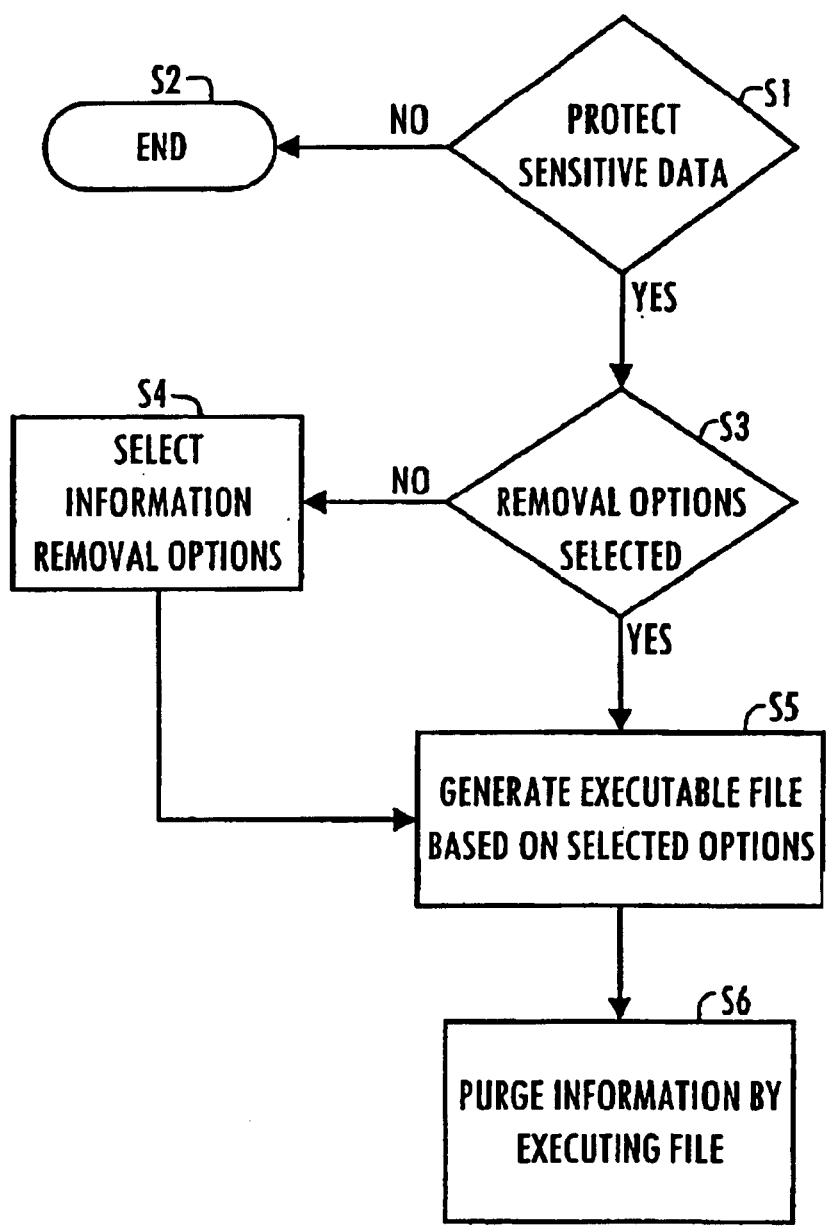
FIG. 2 is a flowchart of an example process for removal of sensitive information from a computing system according to an example embodiment of the present invention.

FIG. 2 shows a flowchart of an example process for removal of sensitive information from a computing system according to an example embodiment of the present invention. Initially, it is determined if there is sensitive data or information (or other information) on the computing device or system that it is desired to protect S1. If there is no sensitive information that may require protection, the process terminates S2. If there is sensitive information that it is desired to protect, it is then determined if information removal options have been selected S3. If removal options have not been selected, the user may then select information removal options S4. These options define what information is to be removed (i.e deleted, purged) upon initiation of a purge. Further, as will be shown following, these options define other factors that are used during the purge of information. After the options have been entered, an executable file is generated based on the selected information removal options S5. The executable file contains instructions and/or commands that perform the removal of the desired information. The executable file may be in the form of any computer language that may perform removal of information from a computing system, however, preferably this language is a script language that is easily executable by the computing system. The executable file is then executed and the information purged from the computing system S6. The information is purged by deleting the file/directory information in the File Allocation Table (FAT) as well as overwriting the entire file in physical memory one or more times. The number of overwrites is programmable by the user. One or more entire disk drives may be purged by performing a low level sector-by-sector purge of all information on the selected disk(s).

Figure 3:
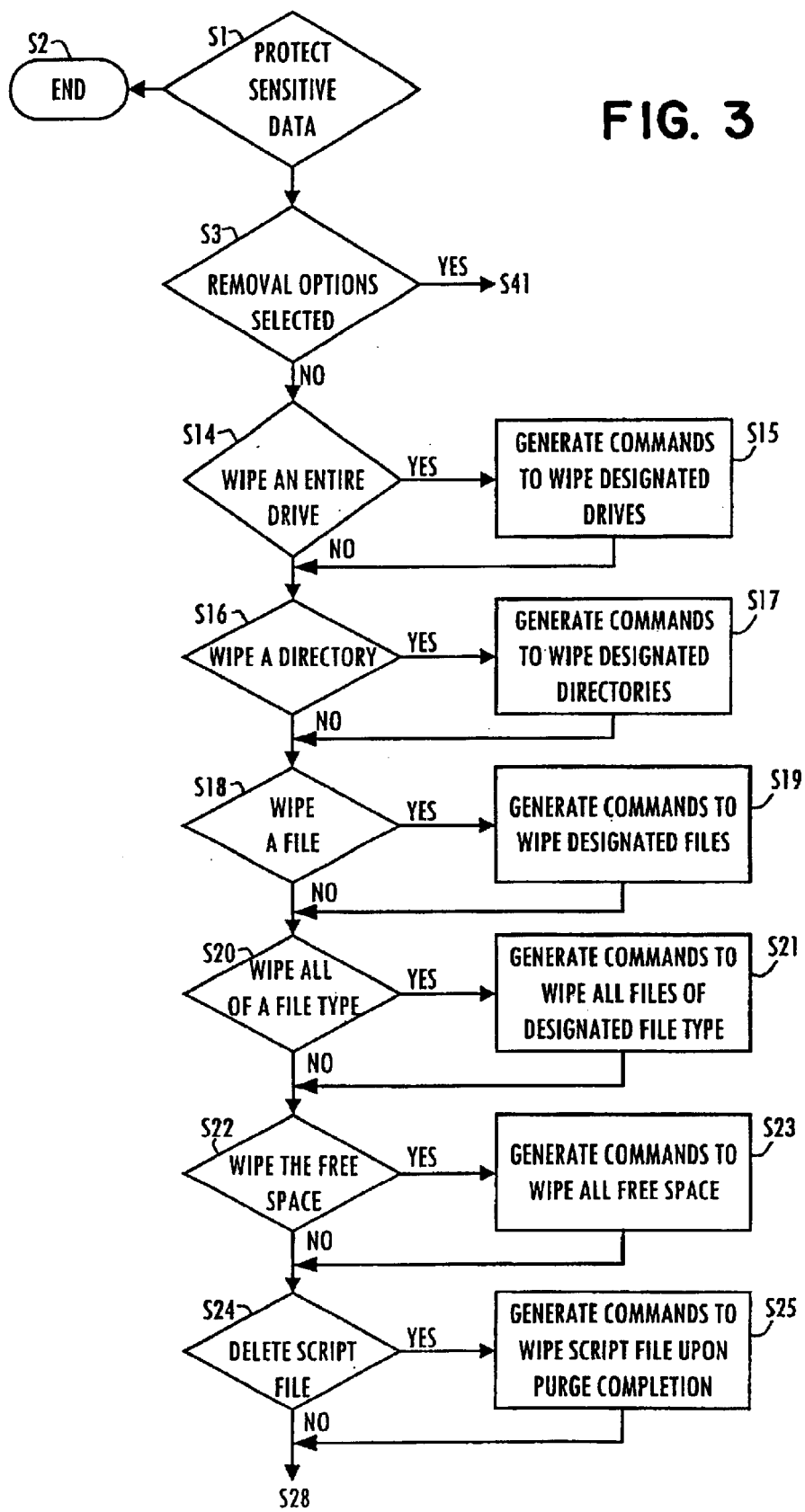
FIG. 3 is a flowchart of an example process for selecting information removal configurations and options according to an example embodiment of the present invention.

FIG. 3 is a flowchart of an example process for selecting information removal configurations and options according to an example embodiment of the present invention. As noted previously, it is first determined whether there is information (sensitive or otherwise) that it is desired to protect S1, and if not the process ends S2. It is then determined whether removal options have been selected S3. If removal options have been selected, the process continues on FIG. 4 at S41. If removal options have not been selected, then the process proceeds to provide the user with selectable options that will be used to create the executable file and, therefore, purge sensitive information on the computing system upon execution of the executable file. It is preferable that the executable file be a script file, therefore, the terms "executable file", "purge file", and "purge script file" may be used interchangeably to illustrate the present invention. However, the invention is not limited to the use of a script file, and any executable file that allows instructions and/or commands that perform deletion of information from a computing system are within the spirit and scope of the present invention. Further, the terms "wipe", "delete", and "purge" all relate to removal of information from a storage device and may be used interchangeably to describe and illustrate the present invention.

A user determines if it is desired to wipe an entire disk drive S14. This relates to wiping all information from a particular drive, for example a "C" hard drive, "A" floppy drive, "D" compact disc (CD) drive, etc. on a computing system. When this option is selected, a low level purge of information from the drive may be performed that not only wipes sensitive information, but performs a wipe of all information on the selected drive on a sector by sector basis. The purge occurs on the selected one or more drives from the first sector through the last sector.

If the user selects to wipe an entire drive, commands may be generated to wipe the designated drives S15. The user may also select to wipe one or more specific directories in the computing system S16. If the user selects to wipe one or more particular directories, commands may be generated to wipe the designated directories S17. The user may select to wipe just one or more particular files S18. If the user desires to wipe a particular file, commands may be generated to wipe the designated files S19. The user may also select to wipe all files of a particular file type S20. For example, the user may desire that all file types of, for example, ".doc", ".exe", ".wp", ".bin", ".com", etc. be deleted upon the initiation of a purge. If this option is selected by the user, commands may be generated to wipe all files of the designated file type S21. The user may enter one or more different file types under this option. All file types in the computing system regardless of where stored, may be wiped if this option is selected.

It may be desired and selected to wipe all free space in storage devices of the computing system S22. This option may be used to purge all unused or free space in the computing system, or on a specific drive. Free space may occur after an end of file (EOF) marker and before the next sector or cluster physically begins on a drive. Selection of this option causes the purge of all the free space on the drive to ensure no left over or residual information remains on the drive. If the user selects this option, commands may be generated to wipe all free space on the one or more selected drives S23. The user may also select to have the executable file or script file deleted after completion of the purge S24. This option deletes the contents of the script file once the purge is complete. The default value may be set to off. If this option is selected, commands may be generated to wipe the executable or script file upon purge completion S25.

Figure 4:
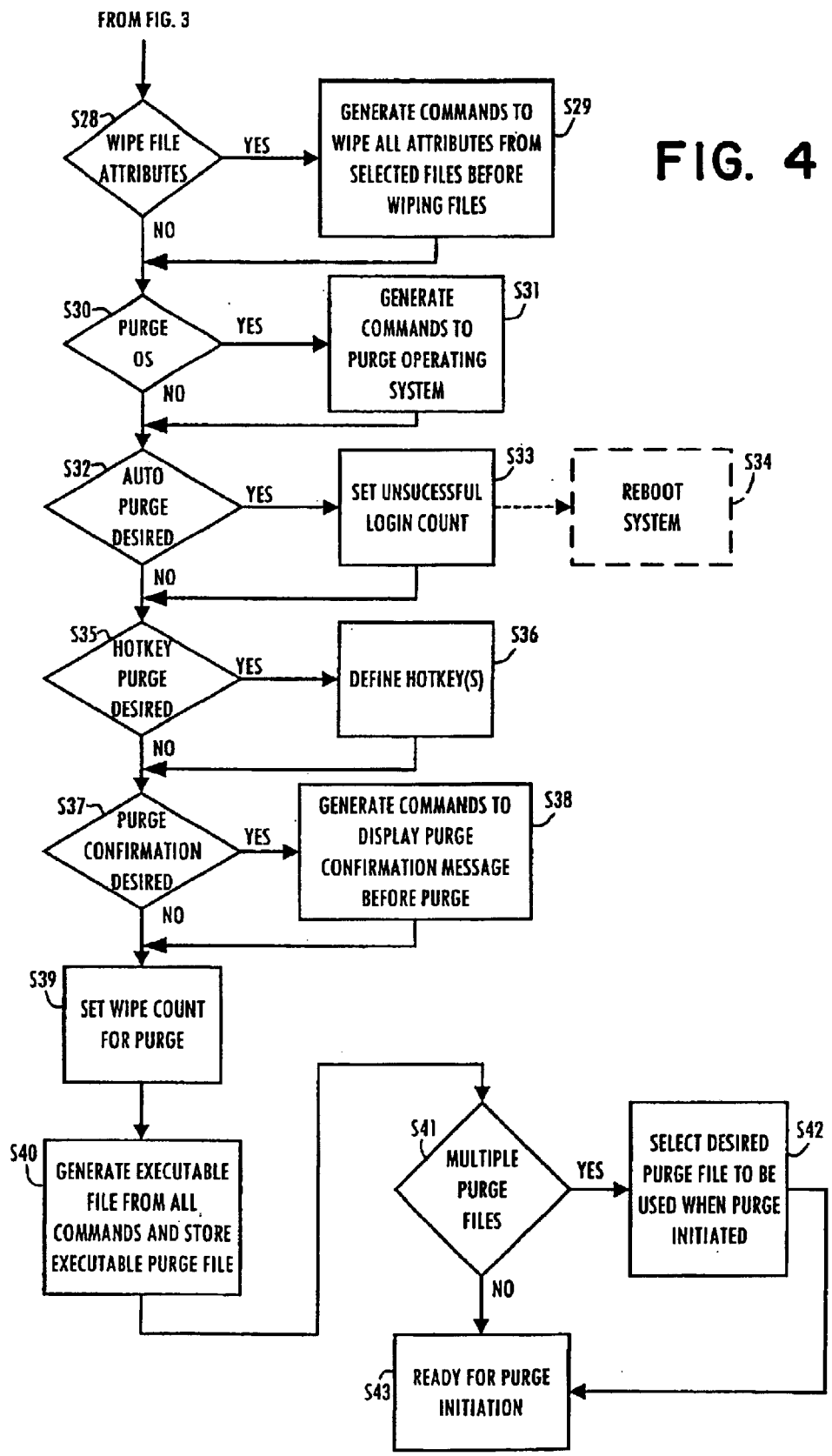
FIG. 4 is a flowchart of the remainder of the example process for selecting information removal configurations and options of FIG. 3 according to an example embodiment of the present invention.

FIG. 4 shows a flowchart of the remainder of the example process for selecting information removal configurations and options of FIG. 3 according to an example embodiment of the present invention. The user may select an option that causes the attributes of selected files to be purged to be wiped before the purge of the selected files S28. There are certain file attributes or parameters that may be associated with files in computing systems. These attributes may include, for example, read-only, write-only, archive, hidden, etc. Some attributes may hinder or prevent a particular file from being deleted or removed, for example, a read-only attribute cannot be written to or deleted until that attribute is first removed. Therefore, a wipe or clear attributes option according to the present invention allows a user to clear all attributes of a given file before that file is wiped from the system. If the wipe attribute option is turned off, it is possible that files protected by read-only or hidden attributes may not be wiped when the purge of information is initiated. If the user selects the option to wipe file attributes, commands may be generated to wipe all attributes from selected files before purging the files S29. The user may also select to purge the operating system S30. This option may disable the operating system on the next system boot by deleting operation system files before they have time to boot up. If this option is selected, commands may be generated to purge the operating system S31.

An auto purge option may also be selected S32. When this option is active, a system initiated purge may automatically occur when a pre-specified number of unsuccessful logon attempts is made to the computing system. When this option is selected, the user must also enter a number of unsuccessful logon attempts detected before the automatic purge is initiated S33. Depending on the computing system, the computing system may need to be rebooted to ensure activation of this option S34.

The user may also select an option which allows hotkey initiation of the purge of information S35. If a user selects this option, the user must define one or more hotkeys that once pressed initiate a purge S36. The hotkey may be composed of a single key, or two or more keys. If multiple keys are selected, one key may be a hotkey modifier, for example, Shift, WIN, Alt, Ctrl, etc., and any other key on the keyboard, for example, A–Z, 0–9, F1–F12, +, End, etc. If hotkey purge is selected, once the hotkey sequence occurs, a purge of the information is initiated. The user may also desire that a confirmation message be displayed asking the initiator of a purge whether they are sure they want to purge information S37. If this option is selected, when a purge operation is initiated (except for an automatic purge), a menu box may be displayed prompting the user to select yes or no (or OK, Continue, Cancel, etc.) to confirm the purge of information before the purge S38.

In systems and methods for programmable removal of sensitive information from a computing system according to the present invention, a user may set a wipe count to be used for the purge of the information. The wipe count may be used to set the number of overwrites of the storage locations when a purge is performed. Each pass (i.e., wipe) may write a different pattern to the storage locations from the previous wipe. For example, one pass may write the binary values of all zeros (e.g., "00000000" etc.), whereas the following pass writes the compliment of this, i.e., all ones (e.g., "11111111"). There may be a default number of overwrites set. For example, a default number of three overwrites may exist if no other number is set. However, the user may enter anywhere from zero to a set maximum in the wipe count box to denote the number of overwrites used during a purge of the information.

Once all options have been selected, an executable file may be generated from all the commands representing the selected configurations and options, and stored as an executable purge file S40. As noted previously, this executable file may use commands or be written in a language from any programming language, however, it is preferable that the executable file be a script file for easy execution by the computing device.

Systems and methods according to the present invention allow multiple script files to be generated and stored. For example, one script file may be generated whereby all information on a particular selected drive is wiped upon initiation of a purge. Another script file may have been generated whereby only files of a particular file type are wiped upon the initiation of a purge. Thus, multiple purge files may exist S41. If multiple purge files do exist, the user may be required to select a desire purge file to be used when a purge is initiated S42. Upon the selection of a purge file, the computing system is ready for any purge initiation S43. Therefore, depending on the options or configurations chosen by a user, an executable purge file may be created that when executed performs the purge functions desired. Once created, executable purge files may be viewed by the user using a wordprocessor and manually edited if desired.

Figure 5:
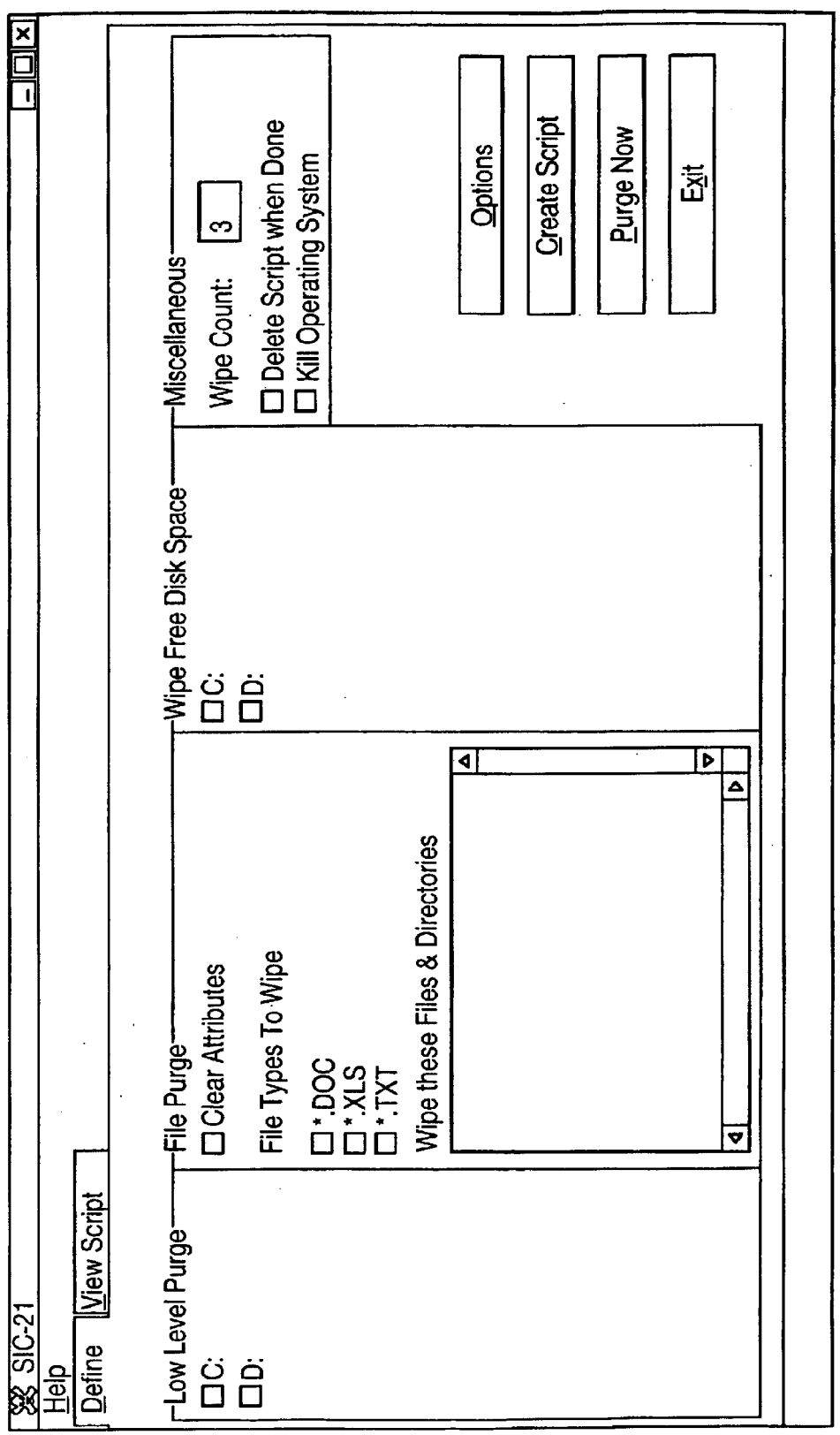
FIG. 5 is a diagram of an example display screen menu for entering configuration information according to an example embodiment of the present invention.

FIG. 5 shows a diagram of an example display screen menu for entering configuration information according to an example embodiment of the present invention. As shown in FIG. 5, and noted previously, the user may select a low level purge of one or more disk drives, select to wipe the attributes from a particular file, select to wipe all files of a particular file type, manually enter file types and/or associated directories, select to wipe the free disk space of a particular drive, select a wipe count, select deletion of the script file or executable file when purge is completed, select to kill or wipe the operating system during purge, etc.

After selecting the configuration, the user may then select "Create Script" which causes the executable file to be created that will be executed to perform the purge of information. If a purge file already exists or has been selected, the user may select the "Purge Now" option that initiates execution of the purge of the information. Further, the system may include an online help capability designed to provide quick answers to the most common concerns of a user. The "Options" button, when selected, presents another menu screen for selection of various options by a user that may also be used in creation of the executable purge file.

Figure 6:
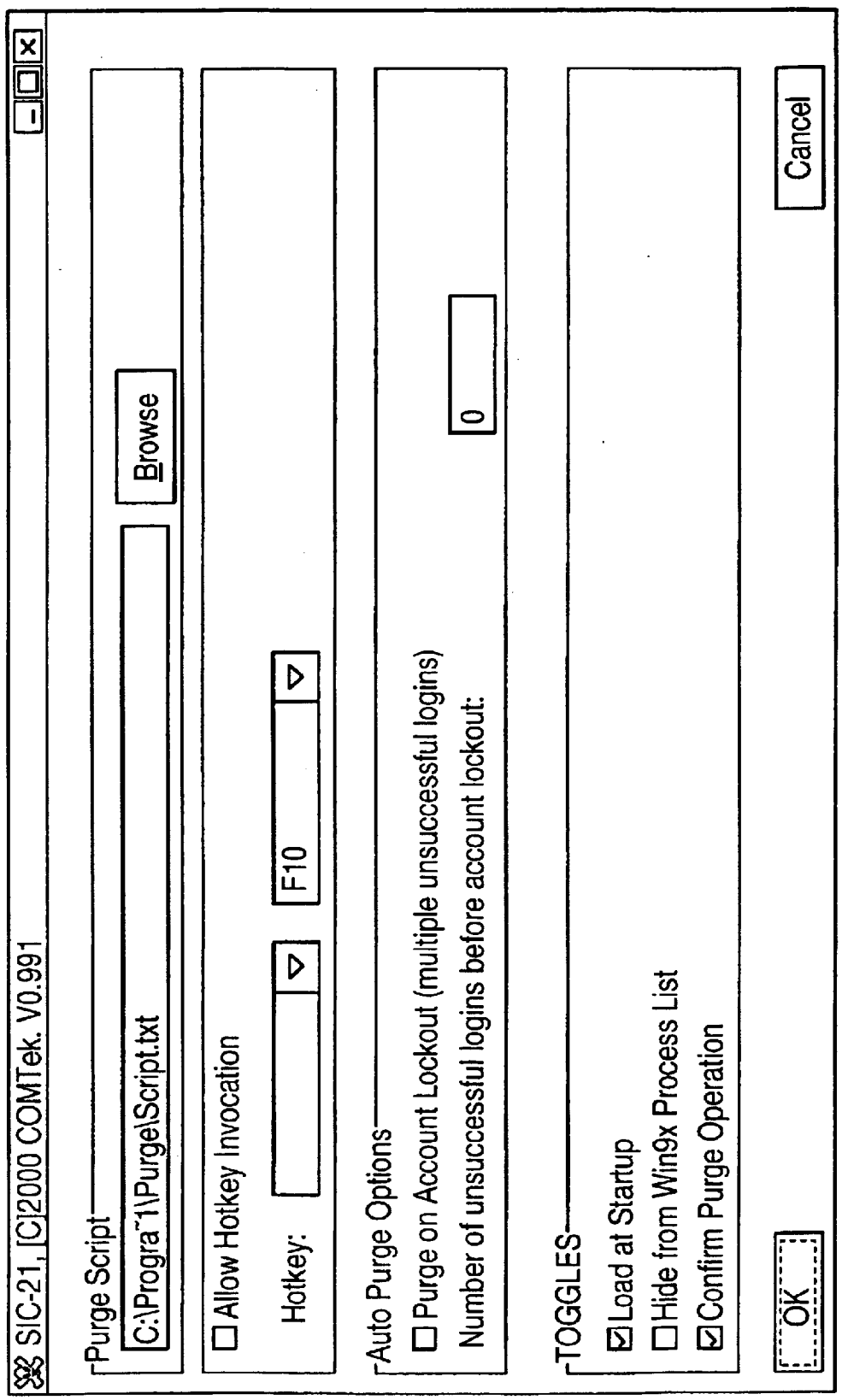
FIG. 6 is a diagram of an example display screen that allows a user to enter options desired during a purge of information.

FIG. 6 shows a diagram of an example display screen that allows a user to enter options desired during a purge of information. As shown in FIG. 6, the menu may provide the name of the executable purge file which allows the user to browse or edit the file. Further, input boxes may be displayed allowing the user to select one or more hotkeys, along with a box to activate the hot key invocation. The user may also activate a box which enables an automatic purge of information to occur upon a particular number of unsuccessful logins. The screen also provides an input box for the user to enter the number of unsuccessful logins desired to be detected before automatic purge begins.

One or more options may also be selected under toggles, for example, load on start up which when selected causes an icon for the purge facility to appear in the system tray on the end opposite the start button on the task bar in a Windows Desktop display screen. A default may be set whereby this option is on. If a hide from Win9x box is enabled, the purge program may not appear in the Ctrl-Alt-Delete process list in Windows 9x. A preferred default value of off may be desired for this option. Moreover, as noted previously, the user may be given an option to request confirmation of a purge operation. If this option is selected, whenever a purge is initiated manually, a purge verification window may appear and the user must click "ok" (or other authorizing command) before the purge is initiated. A default value of on may be desirable for this function to prevent inadvertent purge of information.

Figure 7:
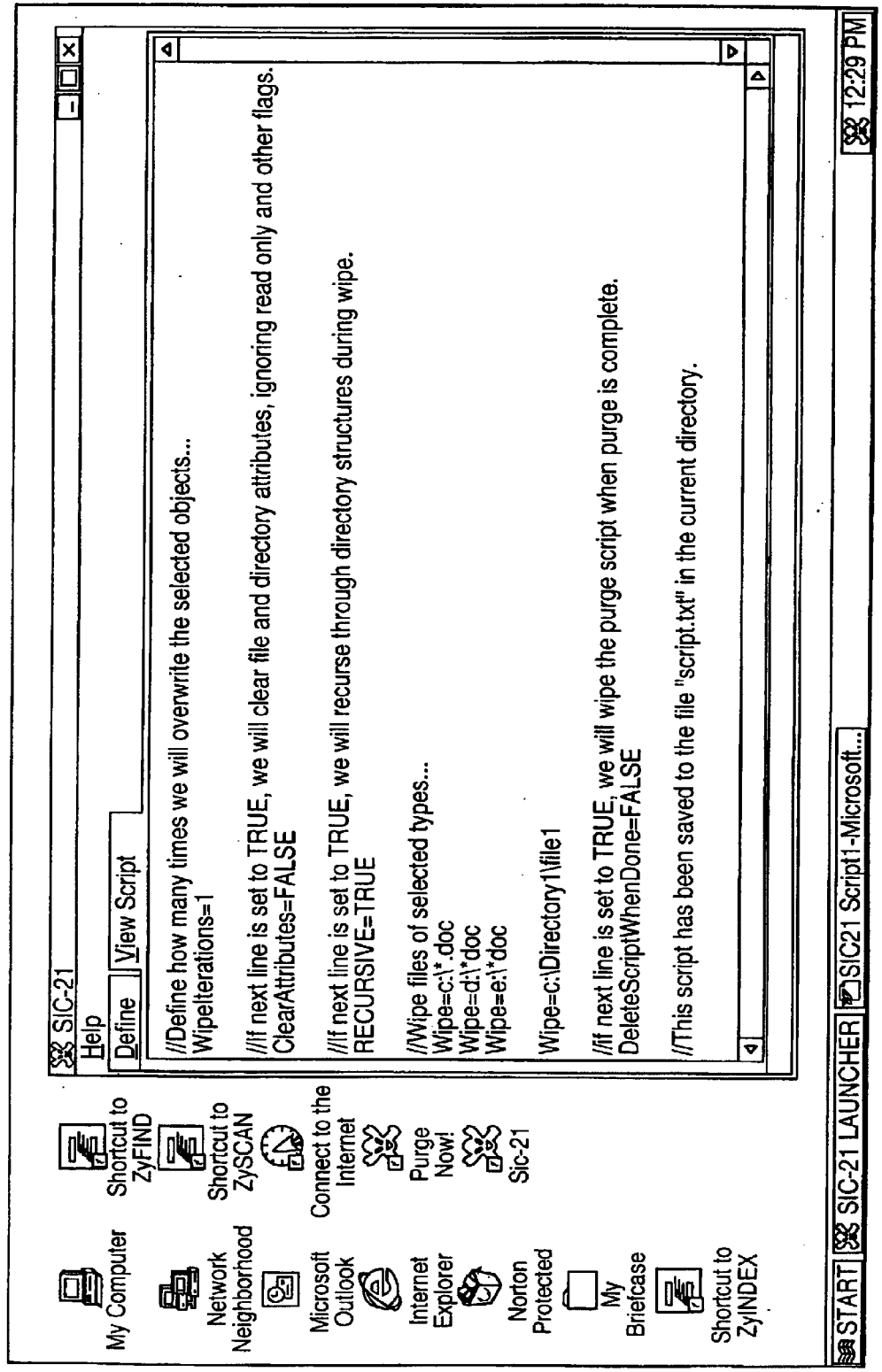
FIG. 7 is a diagram of an example display screen showing an example script executable purge file according to an example embodiment of the present invention.

FIG. 7 shows a diagram of an example display screen showing an example script executable purge file according to an example embodiment of the present invention. In the purge file, "//" denote comments in the file describing the function of the command on the line below the comment. As can be seen from looking at the comments, the user has selected wipe iterations equal to one which will cause only one overwrite of selected information. Further, the clear attributes option has been set equal to false, therefore, attributes associated with files and directories will not be wiped. Next, the user has selected to wipe all files of file type ".doc" from drives "C", "D" and "E". The user has also entered or selected "file1" on the "c" drive in directory "Directory1" for deletion. The user has further selected not to wipe the purge script file once the purge of information is completed. This is an example script file, however, a script file may include much more information based on configurations and options selected by a user than the examples shown in FIG. 7. Further, a script file may consist of only one or two commands and still be within the spirit and scope of the present invention. In any event, the script file defines the sequence of commands that will be executed upon initiation of a purge as well as the information to be purged.

Figure 8:
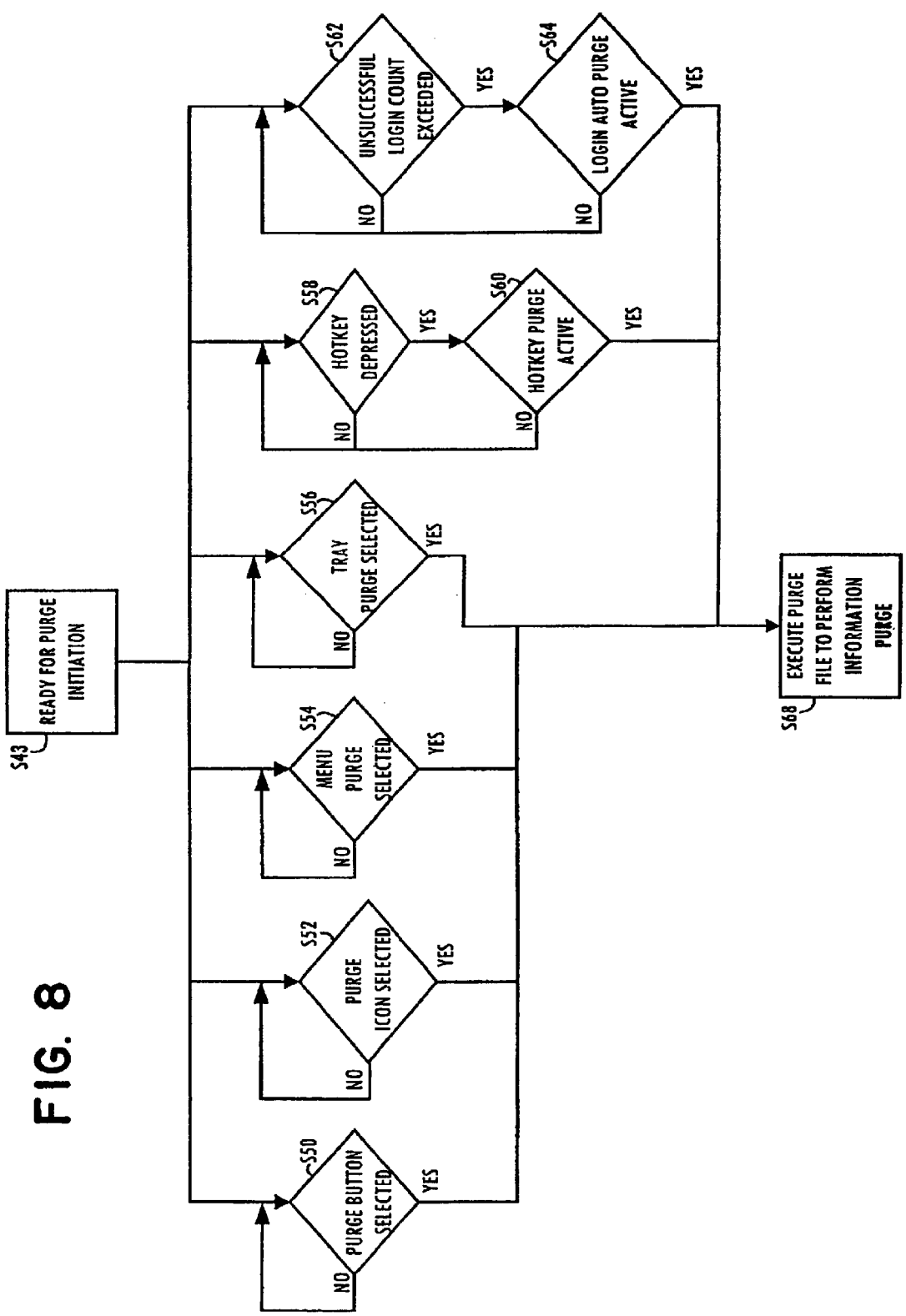
FIG. 8 is a flowchart of an example process for initiation of a purge of information in a computing system according to an example embodiment of the present invention.

FIG. 8 shows a flowchart of an example process for initiation of a purge of information in a computing system according to an example embodiment of the present invention. Once the user has selected all configuration and purge options, and an executable file has been generated and stored, the system is ready for purge initiation S43. The computing system has a defined executable purge file and awaits for any one of many possible events to occur that may initiate a purge of information. The "Purge Now" button in the screen shown in FIG. 5 may be selected S50. If the purge button is selected, the purge file is executed to perform the information purge S68. Further, a purge icon may be selected S52. The purge icon may exist on a main screen or desktop screen of a graphical user interface of the computing system. If selected, this will also initiate the purge of information S68. Moreover, a purge may be initiated by going to a menu and selecting a purge from the menu S54. The purge command may exist under a drop down menu such as file, edit, options, etc. Once selected, information is purged from the computing system by executing the purge file S68.

As noted previously, a purge icon may also be resident in the tray at the bottom of a Window's display S56. Upon selection of this icon in the tray, the purge file may be executed and a purge of information performed S68. The computing system may note that certain hotkeys have been depressed S58. A check may be performed to determine if a hotkey purge is active and if not, nothing occurs S60. If a hotkey purge has been set active, then a purge of information will occur S68. The purge facility on the computing system may monitor the hotkey(s) if the hotkey purge is active, and immediately initiate the purge of information upon detection of the hotkey(s) being selected.

Moreover, the computing system may detect that multiple unsuccessful logins have been attempted on the computing system S62. If the number of unsuccessful logins have been exceeded, the system may determine if login automatic purge is active S64 and if not, nothing may occur. If automatic purge is active, then a purge is automatically performed which purges the selected information on the computing system S68. Therefore, in system and methods for a programmable removable of sensitive information from a computing system according to the present invention, a purge of sensitive information or other information may be initiated by any one of multiple methods.

Figure 9:
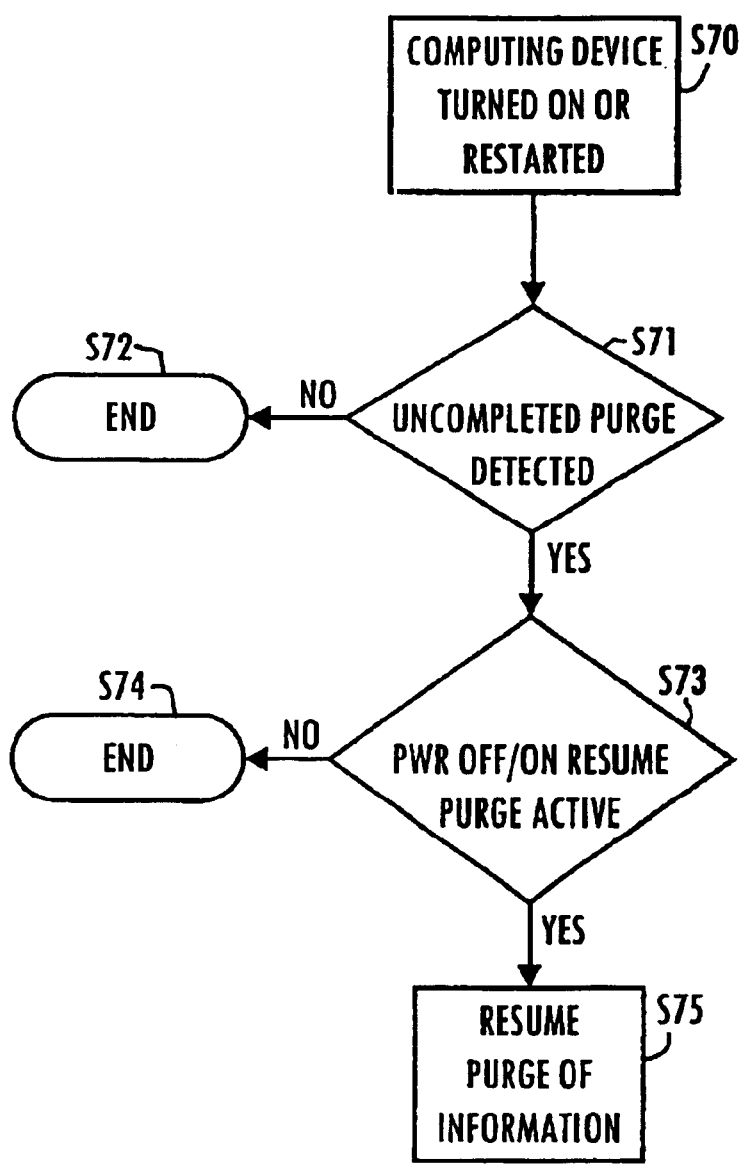
FIG. 9 is a flowchart of an example process for resuming a purge after a computing system has been powered off and then back on according to an example embodiment of the present invention.

FIG. 9 shows a flowchart of an example process for resuming a purge after a computing system has been powered off and then back on according to an example embodiment of the present invention. A hostile entity may attempt to bypass a purge operation by turning the computing device off and then turning the computing device back on, or restarting the computing device S70. The purge facility on the computing system may then determine if a uncompleted purge is still pending S71, and if not, no further action is taken S72. If the system detects that a purge had been in progress, but was not completed, the system may then determine if the user has selected to resume a purge after a power off and back on or restart S73. This may be an option that is selected in a configuration or options menu. If a resume purge has not been set active, the process ends S74. If the resume purge has been set active, the system may then resume purge of the information S75. Therefore, a hostile entity is not allowed to bypass or circumvent a purge operation by either turning the computing device off and then back on, or restarting the computing device.

FIG. 10 shows a block diagram of an example system with multiple computing devices for programmable removable of sensitive information according to an example embodiment of the present invention. As shown in FIG. 10, two or more computing devices 10 may be configured in a network 30. Each computing device, 10, and 32–40, may communicate with each other over network 30. Therefore, one computing device in the network 30, e.g., computing device 10, may initiate the purge of information from one or more other computing devices, e.g., 32–40. This is advantageous in that a purge of sensitive information may be initiated remotely from the location of the sensitive information. Network 30 may be any of many types of networks, e.g., a local area network (LAN), wide area network (WAN), or a wireless local area network (WLAN). Further, one or more of computing devices 10 and 32–40 may be a portable computing device such as a laptop computer, mobile control or processing device, personal digital assistant (PDA), etc. This provides increased security in that should a hostile entity attempt a number of unsuccessful logins at, for example, computing device 36, computing device 36 may report this to another computing device, for example, computing device 32, whereby computing device 32 may initiate and monitor the purge of sensitive information that resides at computing device 36. This is advantageous in that a hostile entity attempting to turn off or restart computing device 36 can not defeat the purge of information since is being monitored and/or initiated by a remote computing device 32.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for programmable removal of information from a computing system for increased computer system security comprising:

selecting at least one information removal option including a number of unsuccessful going attempts, the selecting being performed on a computing device;

generating a purge script file based on the selected at least one information removal option; and initiating a purge of information automatically from at least one computing device in the computing system, the purge being performed by execution of the purge script file automatically when the selected number of unsuccessful logon attempts to at least one computing device occurs, wherein the purge comprises deleting file and directory information in a File Allocation Table related to the information and overwriting the information in physical memory at least once, and wherein sensitive information may be removed from at least one computing device automatically based on the selected at least one information removal option.

2. The method according to claim 1, further comprising selecting the at least one information removal option using a graphical user interface (GUI) on the computing device.

3. The method according to claim 1, wherein the selecting comprises at least one of selecting to purge at least one disk drive, selecting to purge at least one directory, selecting to purge at least one file, selecting to purge files of at least one file type, selecting to purge all free space of at least one disk drive, selecting to purge the operating system, selecting a number of overwrites desired during the purge, selecting to clear file attributes before the purge, selecting to delete the purge script file after the purge, selecting at least one hotkey that will cause the initiating of the purge of information, selecting a number of unsuccessful logon attempts to occur before automatic initiation of the purge, and selecting a purge confirmation menu to appear after the initiating but before the purge is performed.

4. The method according to claim 1, further comprising generating at least one command for each selected at least one information removal option, the at least one command being generated during generation of the purge script file and being placed in the purge script file.

5. The method according to claim 1, further comprising initiating a purge of information automatically from all the at least one computing device in the computing system automatically when the pre-selected number of unsuccessful logon attempts to at least one computing device occurs.

6. The method according to claim 1, wherein the computing system comprises at least one remote computing device operably connected to the computing system.

7. The method according to claim 6, wherein the at least one remote computing device and the at least one computing device are operably connected in a network.

8. The method according to claim 7, wherein the network is a wireless network.

9. The method according to claim 1, further comprising generating a plurality of purge script files, each generated plurality of purge script files being based on different preselected at least one information removal option.

10. The method according to claim 9, further comprising selecting one of the plurality of purge script files, the initiating of the purge of information being performed by execution of the selected one of the plurality of purge script files.

11. An article comprising a storage medium having instructions stored therein, the instructions when executed causing a computing device to perform:

receiving selections for at least one information removal option including a number of unsuccessful going attempts;

generating a purge script file based on the selected at least one information removal option; and initiating a purge of information automatically from at least one computing device in a computing system based on detecting the selected number of unsuccessful logon attempts to at least one computing device in the computing system, the purge being performed by execution of the purge script file, wherein the purge comprises deleting file and directory information in a File Allocation Table related to the information and overwriting the information in physical memory at least once, and wherein sensitive information may be removed from at least one computing device automatically based on the selected at least one information removal option.

12. The article according to claim 11, further comprising generating at least one command for each selected at least one information removal option, the at least one command being generated during generation of the purge script file and being placed in the purge script file.

13. The article according to claim 11, further comprising initiating the purge of information automatically upon detecting the selection of at least one hotkey on at least one computing device.

14. The article according to claim 11, further comprising generating a plurality purge script files, each generated plurality of purge script files being based on different preselected at least one information removal option.

15. The article according to claim 14, further comprising receiving a selection of one of the plurality of purge script files, the initiating of the purge of information being performed by execution of the selected one of the plurality of purge script files.

16. A system for programmable removal of information for increased computer system security comprising:

at least one processing device;

at least one storage device operably connected to each at least one processing device; and at least one data entry device operably connected to each at least one processing device, wherein at least one information removal option including a number of unsuccessful going attempts may be selected using the at least one data entry device, at least one processing device generating a purge script file based on the selected at least one information removal option and initiating a purge of information automatically from at least one storage device by executing the purge script file, the automatic purge occurring after detecting a preselected number of unsuccessful logon attempts to at least one processing devices wherein the purge comprises deleting file and directory information in a File Allocation Table related to the information and overwriting the information in physical memory at least once, and wherein sensitive information may be removed from at least one computing device automatically based on the selected at least one information removal option.

17. The system according to claim 16, wherein one of the at least one processing device performs the generating and executing to purge information on at least one storage device operably connected to a second of the at least one processing device.

18. The system according to claim 16, wherein at least one computing device generates a plurality purge script files, each generated plurality of purge script files being based on different preselected at least one information removal option.

19. The system according to claim 18, wherein at least one data input device receives a selection of one of the plurality of purge script files, the initiating of the purge of information being performed by execution of the selected one of the plurality of purge script files by at least one computing device.

20. The system according to claim 16, wherein the at least one data entry device comprises at least one of a keyboard, and a mouse.

21. A method for programmable removal of information from a computing system for increased computer system security comprising:

selecting at least one information removal option including at least one hotkey, the selecting being performed on a computing device;

generating a purge script file based on the selected at least one information removal option; and initiating a purge of information automatically from at least one computing device in the computing system upon selection of the at least one hotkey on a data input device of one said at least one computing device, the purge being performed by execution of the purge script file automatically when the at least one hotkey is selected wherein the purge comprises deleting file and directory information in a File Allocation Table related to the information and overwriting the information in physical memory at least once, and wherein sensitive information may be removed from at least one computing device automatically based on the selected at least one information removal option.

22. The method according to claim 21, wherein the at least one hotkey comprises a hotkey modifier and a key on a keyboard.

23. The method according to claim 22, wherein the hotkey modifier comprises at least one of a Shift key, a Windows key, an Alt key, and a Ctrl key.

24. A system for programmable removal of information for increased computer system security comprising:

at least one processing device;

at least one storage device operably connected to at least one processing device; and at least one data entry device operably connected to at least one processing device, wherein at least one information removal option including at least one hotkey may be selected using the at least one data entry device, at least one processing device generating a purge script file based on the selected at least one information removal option and initiating a purge of information automatically from at least one storage device by executing the purge script file, the purge occurring automatically upon at least one computing device detecting the selection of the at least one hotkey at at least one data input devices, wherein the purge comprises deleting file and directory information in a File Allocation Table related to the information and overwriting the information in physical memory at least once, and wherein sensitive information may be removed from at least one computing device automatically based on the selected at least one information removal option.

25. The method according to claim 24, wherein the at least one hotkey comprises a hotkey modifier and a key on a keyboard.

26. The method according to claim 25, wherein the hotkey modifier comprises at least one of a Shift key, a Windows key, an Alt key, and a Ctrl key.

* * * * *